United States Patent [19] … [11] 3,888,878
Pande et al. … [45] June 10, 1975

[54] METHOD OF MAKING 5,6-DIHYDRO-2-METHYL-1,4-OXATHIIN-3-CARBOXAMIDE 4,4-DIOXIDES

[75] Inventors: Gyan S. Pande, Guelph, Ontario; Julius A. Balatoni, Kitchener, Ontario, both of Canada

[73] Assignee: Uniroyal Inc., Montreal, Canada

[22] Filed: Dec. 24, 1970

[21] Appl. No.: 101,429

[52] U.S. Cl. .................................. 260/327 P; 71/91
[51] Int. Cl. .............................................. C07d 89/14
[58] Field of Search ..... 260/327 P, 343, 687, 607 A

[56] References Cited
UNITED STATES PATENTS

| | | | |
|---|---|---|---|
| 3,278,562 | 10/1966 | Thigpen et al. | 260/348.5 |
| 3,399,214 | 8/1968 | Kulka et al. | 260/327 |
| 3,428,656 | 2/1969 | Weiss et al. | 260/343 |
| 3,522,279 | 7/1970 | Thigpen et al. | 260/343 |

Primary Examiner—Henry R. Jiles
Assistant Examiner—C. M. S. Jaisle
Attorney, Agent, or Firm—James J. Long

[57] ABSTRACT

5,6-Dihydro-2-methyl-1,4-oxathiin-3-carboxamides, such as 5,6-dihydro-2-methyl-1,4-oxathiin-3-carboxanilide, are oxidized to the corresponding 5,6-dihydro-2-methyl-1,4-oxathiin-3-carboxamide 4,4-dioxides, such as 5,6-dihydro-2-methyl-1,4-oxathiin-3-carboxanilide 4,4-dioxide, in a two-phase liquid medium based on formic acid. One phase is aqueous and contains the oxidizing agent (hydrogen peroxide) along with formic acid, while the other phase is organic (e.g., methyl isobutyl ketone or toluene) and contains the starting carboxamide. The use of formic acid in such a two-phase system results in a good yield of highly pure dioxide in a short reaction time. The dioxides are useful as agricultural fungicides.

27 Claims, No Drawings

METHOD OF MAKING 5,6-DIHYDRO-2-METHYL-1,4-OXATHIIN-3-CARBOXAMIDE 4,4-DIOXIDES

BACKGROUND OF THE INVENTION

1. Field of the Invention

This invention relates to a method of making 5,6-dihydro-2-methyl-1,4-oxathiin-3-carboxamide 4,4-dioxides.

2. Description of the Prior Art

U.S. Pat. No. 3,399,214, Kulka et al., Aug. 27, 1968, discloses oxidation of 5,6-dihydro-2-methyl-1,4-oxathiin-3-carboxamides (there called 2,3-dihydro-5-carboxamido-6-methyl-1,4-oxathiins) to 5,6-dihydro-2-methyl-1,4-oxathiin-3-carboxamide 4,4-dioxides (there called 2,3-dihydro-5-carboxamido-6-methyl-1,4-oxathiin sulfones) by treatment with hydrogen peroxide in a suitable solvent such as acetic acid, acetone, or mixtures thereof. The liquid reaction medium is a single phase. It has been desired to improve the process, particularly with respect to controllability, yield and reaction time. The present invention provides such an improved process, based on the use of formic acid in place of acetic acid, in a two-phase liquid medium having an organic phase immiscible with an aqueous phase containing the oxidizing agent.

SUMMARY OF THE INVENTION

In accordance with the invention, a 5,6-didydro-2-methyl-1,4-oxathiin-3-carboxamide is oxidized to the corresponding 5,6-dihydro-2-methyl-1,4-oxathiin-3-carboxamide 4,4-dioxide in a two-phase liquid medium, one phase comprising aqueous formic acid containing hydrogen peroxide as the oxidizing agent and the other phase comprising an organic solvent for the carboxamide.

DETAILS OF THE INVENTION

The substituted oxathiin carboxamide dioxides prepared in accordance with the oxidation method of the invention may be represented by the formula

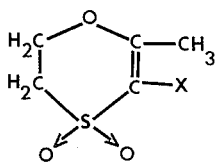

wherein X is the carboxamide function. A highly preferred form of the invention involves oxidation of a starting chemical in which the carboxamide moiety is substituted (i.e., it is a carbamoyl group), particularly phenyl substituted, as in the oxidation of 5,6-dihydro-2-methyl-1,4-oxathiin-3-carboxanilide to 5,6-dihydro-2-methyl-1,4-oxathiin-3-carboxanilide 4,4-dioxide as represented by the equation

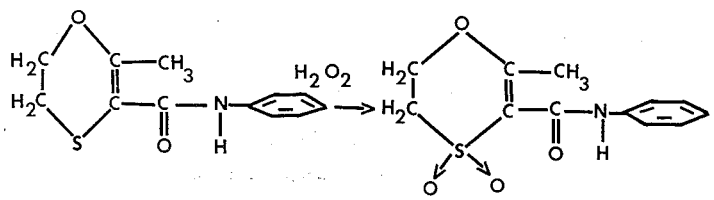

However, the invention is not limited to chemicals in which the nitrogen atom of the carboxamide is substituted with phenyl, but applies in general to all the known chemicals in which one or both of the hydrogen atoms on the nitrogen atom in the carboxamide function are intact (as in the group, carbamoyl) or replaced as in the chemicals described in the above-referred to U.S. Pat. No. 3,399,214, as well as U.S. Pat. Nos. 3,393,202, Kulka et al., July 16, 1968; 3,249,499, von Schmeling et al., May 3, 1966; and 3,402,241, von Schmeling et al., Sept. 17, 1968, the disclosures of which illustrate the many variations in substitution of the carboxamide permissible in the starting chemicals and oxidized products, also called "sulfones" (see particularly the definitions of R and R' in the said patents). It will be noted that the nomenclature employed in the said patents differs from the nomenclature here employed in that the chemicals are named in the patents as "5-carboxamide" oxathiins (e.g. 5-carboxanilido), whereas here the starting chemicals are named as "3-carboxamides" (e.g. 3-carboxamilide).

The oxidizing process of the invention is carried out, as indicated, in a two-phase liquid medium. One phase of the liquid medium is aqueous and contains hydrogen peroxide as the oxidizing agent, as well as formic acid. The other phase is organic and comprises a solvent which is substantially immiscible with water. Suitable solvents for use as the non-aqueous phase are the organic liquids which are inert under the conditions of the reaction, and in which the starting oxathiin carboxamide is at least partially soluble. Hydrocarbon solvents are suitable, whether aliphatic as in such saturated hydrocarbons as the alkanes, e.g., n-hexane, n-heptane, dodecane, etc., cycloaliphatic as in cyclohexane, cylooctane, etc., or aromatic as in benzene, toluene, xylene, etc. Non-hydrocarbon solvents are also suitable, notably the ketones which are insoluble or only sparingly soluble in water, particularly the dialkyl ketones in which the alkyl groups are the same or different and together contain from 3 to 5 carbon atoms e.g., methyl ethyl ketone, methyl isobutyl ketone, etc. Preferably the solvent has a boiling point in the range of 80° to 120°C.

The amount of formic acid employed usually ranges from 0.9 to 1.1 moles, preferably 1 mole, and the amount of organic solvent usually ranges from 200 to 300 ml., preferably 240 to 260 ml., per gram mole of starting carboxamide.

At the start of the process, the starting carboxamide, the organic solvent, and the formic acid are usually mixed together. The starting chemical initially forms a slurry in the liquid medium.

The oxidizing reagent, hydrogen peroxide, is added as an aqueous solution, to the mixture containing the starting oxathiin carboxamide, formic acid and organic solvent. The hydrogen peroxide is suitably added gradually, particularly at the start of the process. In this way the initial exotherm can be controlled. The liquid reaction medium forms two liquid phases, one an aqueous phase containing water, hydrogen peroxide, and formic acid. The other liquid phase is the organic solvent containing some formic acid, and dissolved oxathiin carboxamide, which remains almost entirely in the organic phase. Accordingly, the oxidizing agent and the material being oxidized are essentially present in separate phases, and are brought together gradually over a period of time through diffusion as the reaction mixture is agitated. This prevents rapid heat buildup and provides good controllability. It is not necessary to use a large excess of hydrogen peroxide to get good yields in the method of the invention. A 5–50 percent, more preferably 10 percent, molar excess (over the theoretical 2 moles) is sufficient.

The optimum temperature range for the reaction is of the order of about 70° to 95°C., preferably about 75° to 92°C. Temperature control is facilitated by the presence of the solvent which aids in dissipating the large amount of heat evolved in the early stages of the reaction.

The oxidized product, that is, the oxathiin carboxamide dioxide, remains dissolved in the reaction mixture while the reaction mixture is still warm from the heat of the reaction, but separates when the reaction mixture is cooled. The oxathiin carboxamide dioxide, recovered from the reaction mixture by conventional methods, is found to be a pure, clean-looking solid free from the significant amounts of tarry material encountered in prior practice where the oxidizing agent and starting chemical are in a single-phase liquid reaction medium.

The method of the invention based on formic acid in a two-phase liquid medium unexpectedly makes it possible to obtain high yields of oxidized products, for example 97 percent. This is in contrast with yields of only 80 percent on a large scale, obtained by the prior method based on acetic acid or acetic acid-acetone in a one-phase liquid medium. Surprisingly, the high yields obtainable by the method of the invention are attained in relatively short reaction times, usually less than 2 hours and typically only about 1½ hours, in contrast to the 5–9 hours used in the prior acetic acid, or acetic acid-acetone, one-phase liquid process, on a large scale.

After removal of the oxathiin carboxamide dioxide products from the reaction medium, for example by filtration, two liquid phases remain, aqueous and organic. The aqueous phase consists of water, formic acid, small amounts of unused hydrogen peroxide and 1 to 2 percent of dissolved oxathiin carboxamide dioxide product. The organic phase contains the solvent, some formic acid and small amounts (5–6 percent) of dissolved oxathiin carboxamide product. Most of the formic acid remains in the aqueous layer which is ordinarily discarded. The organic phase may be recycled, or it may be treated to recover the dioxide product therein.

In the prior one-phase liquid process based on acetic acid, or acetic acid-acetone, the product separates as a solid, leaving behind a liquid comprising acetic acid (with or without acetone), water and dissolved oxathiin carboxamide dioxide product (5 to 20 percent). If this liquid from the prior art process is recycled, undesirable dilution of the acetic acid takes place with successive additions of aqueous hydrogen peroxide.

In terms of cost and productivity, the method of the invention therefore is much superior to prior practice.

The following examples will serve to illustrate the practice of the invention in more detail. All temperatures are Centigrade.

EXAMPLE 1

Step 1.

5,6-Dihydro-2-methyl-1,4-oxathiin-3-carboxanilide (235g., 1 mole) and methyl isobutyl ketone (230 ml.) were mixed in a three-necked flask fitted with a condenser, a stirrer and a dropping funnel. Formic acid (46g., 1 mole) was added to the mixture which was in the form of a smooth slurry.

Step 2.

Hydrogen peroxide (300 ml., 30 percent soln; i.e. 50 percent excess,) was then added gradually by means of the dropping funnel, forming a separate, aqueous phase. The temperature rose and the carboxanilide dissolved in the organic phase. By the time 20 percent of the total hydrogen peroxide was added (15–20 min.) the mixture started to reflux (temp. about 90°–92°). The remainder of the peroxide was added rather quickly (5–10 min.).

Step 3

The reaction mixture was refluxed for about 1½ hours during which time its colour changed from clear to reddish brown.

Step 4

The contents of the reaction vessel were next poured, while still hot, into a beaker and cooled to room temperature. Crystals of 5,6-dihydro-2-methyl-1,4-oxathiin-3-carboxanilide 4,4-dioxide were filtered, washed with water and dried. (wt. 227g.; M.P. = 132°)

Step 5

The mother liquor was separated into an organic and an aqueous layer. The organic layer was washed and methyl isobutyl ketone distilled off. This left behind 32 g. more 5,6-dihydro-2-methyl-1,4-oxathiin-3-carboxanilide 4,4-dioxide (mp. 132°). Thus the total yield of the 4,4-dioxide product was 259 g. (97 percent of theoretical).

EXAMPLE 2

The preparation was carried out as in Example 1 except in Step 5 the organic layer was saved without recovering 4,4-dioxide product. The yield was 85 percent of the theoretical.

EXAMPLE 3

The preparation was carried out as in Example 1 using the organic layer, saved in Example 2, as the solvent. The yield of 4,4-dioxide product after Step 4 (Ex. 1) was 97 percent of the theoretical.

EXAMPLE 4

The preparation was carried out as in Example 1 using only (20 percent excess) 245 ml. of hydrogen peroxide. Total yield of 4,4-dioxide product was 95 percent of the theoretical.

EXAMPLE 5

The preparation was carried out as in Example 1 using only (10 percent excess) 225 ml. of hydrogen peroxide. Total yield of 4,4-dioxide product was 97 percent of the theoretical.

EXAMPLE 6

The preparation was carried out as in Example 1 with the following difference in Step 2:

I. Hydrogen peroxide was added very slowly so that the temperature of the reaction mixture did not rise above 75°.

II. The reaction mixture was next heated on a water bath maintained at 75° for 2 hours. The yield of 4,4-dioxide product was 95 percent of the theoretical.

EXAMPLE 7

Example 5 is repeated using, as the starting chemical, various 5,6-dihydro-2-methyl-1,4-oxathiin-3-carboxamides, in which the carboxamide is N-substituted as indicated in the following table, which also gives the melting point and the yield of the resulting N-substituted -5,6-dihydro-2-methyl-1,4-oxathiin-3-carboxamide 4,4-dioxide.

| N-substituent of 3-Carboxamide | M.P (°C) | Yield (%) |
|---|---|---|
| n-hexyl | 150–151 | 94.5 |
| 2,6-diethylphenyl | 127–129 | 75 |
| o-methylphenyl | 220–222 | 80 |
| 2-chloro-6-methylphenyl | 160–163 | 76.5 |
| o-chloro-2-methylphenyl | 149–151.5 | 99 |
| cyclohexyl | 183–185 | 62 |
| 2,6-dimethylphenyl | 169.5–172.5 | 92 |
| m-nitrophenyl | 186–188 | 87 |
| alpha-naphthyl | 197.5–198 | 98 |
| isopropyl | 145.5–146.5 | 81 | phase system based on formic acid in accordance with the invention. In both cases the Tables show not only the yield of the desired 4,4-dioxide (that is, the sulfone or fully oxidized product) but also the yield of undesirable partially oxidized product, the 4-oxide (that is, the sulfoxide which represents an intermediate or incomplete state of oxidation). It will be understood that the oxidation scheme for the 5,6-dihydro-2-methyl-1,4-oxathiin-3-carboxamide is:

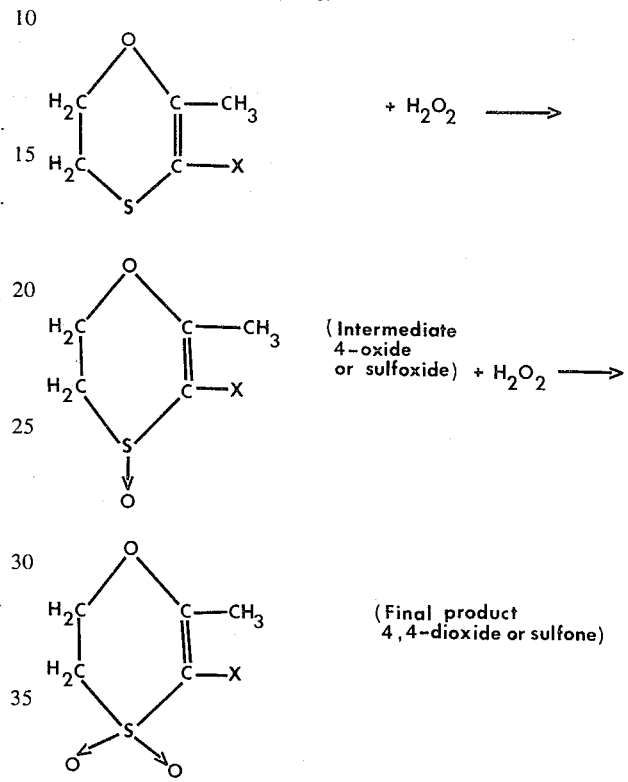

EXAMPLE 8

This Example shows that if acetic acid is employed in a two-phase liquid system, rather than formic acid in accordance with the invention, the rate of reaction is very slow. Table 1 shows the results obtained using acetic acid and methyl isobutyl ketone, to provide two phases, one phase being an aqueous phase containing acetic acid, water and hydrogen peroxide, the other phase being the solvent (methyl isobutyl ketone) and a small amount of acetic acid. The system of Table 1 is outside the invention. Table 1 is to be compared with Table 2 which shows the results obtained using the two- Table 1

Oxidation of 5,6-Dihydro-2-Methyl-1,4-Oxathiin-3-Carboxanilide with Acetic acid and Hydrogen Peroxide Using Methyl isobutyl ketone (MIBK) as solvent.

| Run No. | Carboxanilide moles | Solvent (MIBK) ml. | Acetic acid ml. | Hydrogen Peroxide (30% soln.) ml. | Reflux Time (hr) | Temp. °C | % Yield* based on carboxanilide | |
|---|---|---|---|---|---|---|---|---|
| | | | | | | | Sulfoxide | Dioxide |
| 1. | 0.1 | 100 | 5 | 25 | 4 | 80 | 57 | 0 |
| 2. | 0.05 | 50 | 1 | 12 | 4 | 80 | 70 | 30 |
| 3. | 0.1 | 100 | 1 | 24 | 4 | 90 | 80 | 20 |
| 4. | 0.1 | 100 | 5 | 27 | 6 | 90 | 50 | 50 |
| 5. | 0.1 | 100 | 5 | 27 | 7 | 90 | 50 | 50 |
| 6. | 0.1 | 50 | 5 | 28 | 5.5 | 90 | 30 | 70 |
| 7. | 0.1 | 25 | 5 | 27 | 5.0 | 90 | 20 | 80 |

*Determined by IR and NMR.

Table 2

Oxidation of 5,6-Dihydro-2-Methyl-1,4-Oxathiin-3-Carboxanilide with Formic Acid and Hydrogen Peroxide: Carboxamide 1 mole, MIBK 250 ml., Formic acid 46 g., Hydrogen Peroxide 300 ml. (30% soln.)

| Run No. | Reflux time hrs. | Reflux temp. °C. | % Yield based on Carboxamide | |
|---|---|---|---|---|
| | | | Sulfoxide | Dioxide |
| 8. | 15 | 90 | 0 | 97 |
| 9. | 5 | 90 | 0 | 97 |
| 10. | 2.5 | 90 | 0 | 97.5 |
| 11. | 2.5 | 80–85 | 0 | 97 |
| 12. | 1.5 | 90 | 0 | 97 (a) |
| 13. | 1.5 | 90 | 0 | 95 (b) |

Table 2-Continued

Oxidation of 5,6-Dihydro-2-Methyl-1,4-Oxathiin-3-Carboxanilide with Formic Acid and Hydrogen Peroxide: Carboxamide 1 mole, MIBK 250 ml., Formic acid 46 g., Hydrogen Peroxide 300 ml. (30% soln.)

| Run No. | Reflux time hrs. | Reflux temp. °C. | % Yield based on Carboxamide Sulfoxide | Dioxide |
|---|---|---|---|---|
| 14. | 1.0 | 90 | 2 | 95 |
| 15 | 0.5 | 90 | 4 | 93 |
| 16. | 2.5 | 90 | 0 | 85* |
| 17. | 2.5 | 90 | 0 | 97** |
| 18 | 2.5 | 90 | 0 | 85* |
| 19. | 2.5 | 90 | 0 | 97*** |

*The yield without recovering dioxide from solvent
**Recycling solvent from run No. 16
***Recycling solvent from run No. 18
(a) Amount of hydrogen peroxide — 225 ml. (10% excess).
(b) Amount of hydrogen peroxide — 245 ml. (20% excess).

Comparison of Tables 1 and 2 reveals that in the formic acid two-phase system of the invention (Table 2) the rate of oxidation is faster than in an acetic acid two-phase system. The presence of large amounts of sulfoxide in the Table 1 products indicates an incomplete reaction. The oxidation in acetic acid is only 80 percent complete in 5 hours (Table 1, Run 7), while for the same concentrations, the oxidation in formic acid is complete in 1.5 hours (Table 2, Run 12).

The foregoing results are particularly surprising in view of the fact that when using as the medium acetic acid alone or formic acid alone (both single-phase liquid media), formic acid does not display the superiority over acetic acid obtained in the two-phase liquid medium of the invention. It is only when a water-immiscible solvent is included, to produce a second liquid phase, that the advantages of formic acid over acetic acid are enjoyed. Water-miscible solvents, such as acetone, which do not produce a second liquid phase, do not give the present new results, even with formic acid.

Having thus described our invention what we claim and desire to protect by Letters Patent is:

1. A method of oxidizing a 5,6-dihydro-2-methyl-1,4-oxathiin-3-carboxamide to the corresponding 5,6-dihydro-2-methyl-1,4-oxathiin-3-carboxamide 4,4-dioxide comprising bringing together with agitation the said 5,6-dihydro-2-methyl-1,4-oxathiin-3-carboxamide, and a two-phase liquid medium made up of formic acid, an inert organic solvent substantially immiscible with water, and aqueous hydrogen peroxide, whereby the said 5,6-dihydro-2-methyl-1,4-oxathiin-3-carboxamide is oxidized to the corresponding 5,6-dihydro-2-methyl-1,4-oxathiin-3-carboxamide 4,4-dioxide, and thereafter recovering the said 5,6-dihydro-2-methyl-1,4-oxathiin-3-carboxamide 4,4-dioxide from the reaction mixture.

2. A method as in claim 1 in which the said 5,6-dihydro-2-methyl-1,4-oxathiin- 3-carboxamide is 5,6-dihydro-2-methyl-1,4-oxathiin-3-carboxanilide and the said 5,6-dihydro-2-methyl-1,4-oxathiin-3-carboxamide 4,4-dioxide is 5,6-dihydro-2-methyl-1,4-oxathiin-3-carboxanilide 4,4-dioxide.

3. A method as in claim 1 in which the said inert organic solvent has a boiling point in the range of 80° to 120°C.

4. A method as in claim 1 in which the said inert organic solvent is a dialkyl ketone in which the alkyl groups are the same or different and together contain from 3 to 5 carbon atoms.

5. A method as in claim 1 in which the said inert organic solvent is a hydrocarbon solvent boiling in the range of 80° to 120°C.

6. A method as in claim 1 in which the said inert organic solvent is methyl isobutyl ketone.

7. A method as in claim 1 in which the said inert organic solvent is toluene.

8. A method as in claim 1 in which the aqueous hydrogen peroxide is added gradually to the reaction mixture.

9. A method as in claim 1 in which amount of formic acid is from 0.9 to 1.1 moles and the amount of inert organic solvent is from 200 to 300 ml., per gram mole of 5,6-dihydro-2-methyl-1,4-oxathiin-3-carboxamide.

10. A method as in claim 1 in which the amount of hydrogen peroxide is from 2.1 to 3 moles per mole of 5,6-dihydro-2-methyl-1,4-oxathiin-3-carboxamide.

11. A method as in claim 1 in which the amount of hydrogen peroxide is from 2.1 to 2.3 moles per mole of 5,6-dihydro-2-methyl-1,4-oxathiin-3-carboxamide.

12. A method as in claim 1 in which the amount of hydrogen peroxide is 2.2 moles per mole of 5,6-dihydro-2-methyl-1,4-oxathiin-3-carboxamide.

13. A method as in claim 1 in which the concentration of hydrogen peroxide in the aqueous hydrogen peroxide is 30 percent by weight.

14. A method as in claim 1 in which the reaction mixture is maintained at a temperature of from 70° to 95°C.

15. A method as in claim 1 in which the reaction time is less than 2 hours.

16. A method of oxidizing 5,6-dihydro-2-methyl-1,4-oxathiin-3-carboxanilide to 5,6-dihydro-2-methyl-1,4-oxathiin-3-carboxanilide 4,4-dioxide comprising gradually adding aqueous hydrogen peroxide to a mixture of 5,6-dihydro-2-methyl-1,4-oxathiin-3-carboxanilide in formic acid and an inert organic solvent substantially immiscible with water having a boiling point in the range of 80° to 120°C selected from the group consisting of hydrocarbon solvents and dialkyl ketones in which the alkyl groups are the same or different and have together a total of 3 to 5 carbon atoms, the resulting reaction mixture forming two liquid phases, whereby the 5,6-dihydro-2-methyl-1,4-oxathiin-3-carboxanilide is oxidized to 5,6-dihydro-2-methyl-1,4-oxathiin-3-carboxanilide 4,4-dioxide, and thereafter separating from the reaction mixture the resulting 5,6-dihydro-2-methyl-1,4-oxathiin-3-carboxanilide 4,4-dioxide, the amount of formic acid being one mole and the amount of organic solvent being from 240 to 260 ml. per gram mole of 5,6-dihydro-2-methyl-1,4-oxathiin-3-carboxanilide, the amount of hydrogen peroxide being from 2.1 to 2.3 moles per mole of 5,6-dihydro-2-methyl-1,4-oxathiin-3-carboxanilide, the reaction temperature being from 75° to 92°C.

17. A method as in claim 16 in which the said inert organic solvent is methyl isobutyl ketone.

18. A method as in claim 16 in which the said inert organic solvent is toluene.

19. A method as in claim 1 in which the said 5,6-dihydro-2-methyl-1,4-oxathiin-3-carboxamide has an n-hexyl group as an N-substituent on the 3-carboxamide function.

20. A method as in claim 1 in which the said 5,6-dihydro-2-methyl-1,4-oxathiin-3-carboxamide has a 2,6-diethylphenyl group as an N-substituent on the 3-carboxamide function.

21. A method as in claim 1 in which the said 5,6-dihydro-2-methyl-1,4-oxathiin-3-carboxamide has an o-methylphenyl group as an N-substituent on the 3-carboxamide function.

22. A method as in claim 1 in which the said 5,6-dihydro-2-methyl-1,4-oxathiin-3-carboxamide has a 2-chloro-6-methylphenyl group as an N-substituent on the 3-carboxamide function.

23. A method as in claim 1 in which the said 5,6-dihydro-2-methyl-1,4-oxathiin-3-carboxamide has a cyclohexyl group as an N-substituent on the 3-carboxamide function.

24. A method as in claim 1 in which the said 5,6-dihydro-2-methyl-1,4-oxathiin-3-carboxamide has a 2,6-dimethylphenyl group as an N-substituent on the 3-carboxamide function.

25. A method as in claim 1 in which the said 5,6-dihydro-2-methyl-1,4-oxathiin-3-carboxamide has an m-nitrophenyl group as an N-substituent on the 3-carboxamide function.

26. A method as in claim 1 in which the said 5,6-dihydro-2-methyl-1,4-oxathiin-3-carboxamide has an alpha-naphthyl group as an N-substituent on the 3-carboxamide function.

27. A method as in claim 1 in which the said 5,6-dihydro-2-methyl 1,4-oxathiin-3-carboxamide has an isopropyl group as an N-substituent on the 3-carboxamide function.

* * * * *